March 23, 1965  H. B. ELLIS  3,174,299
REFRIGERATION SYSTEM EMPLOYING A LIQUIFIED GAS
Filed March 19, 1962  2 Sheets-Sheet 1
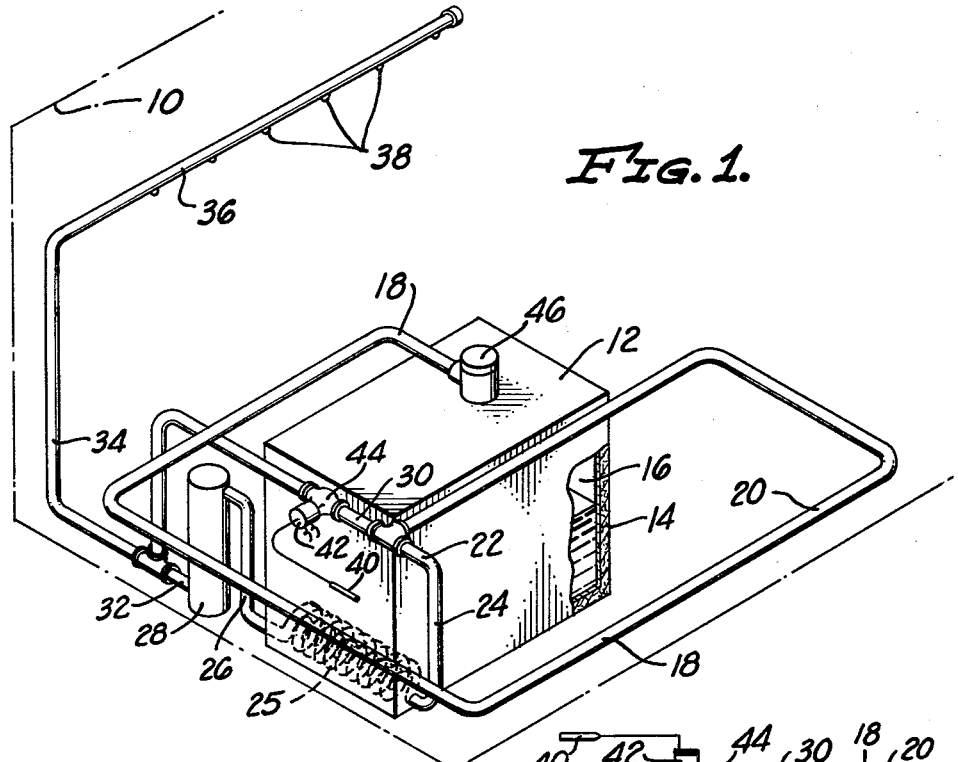
Fig. 1.
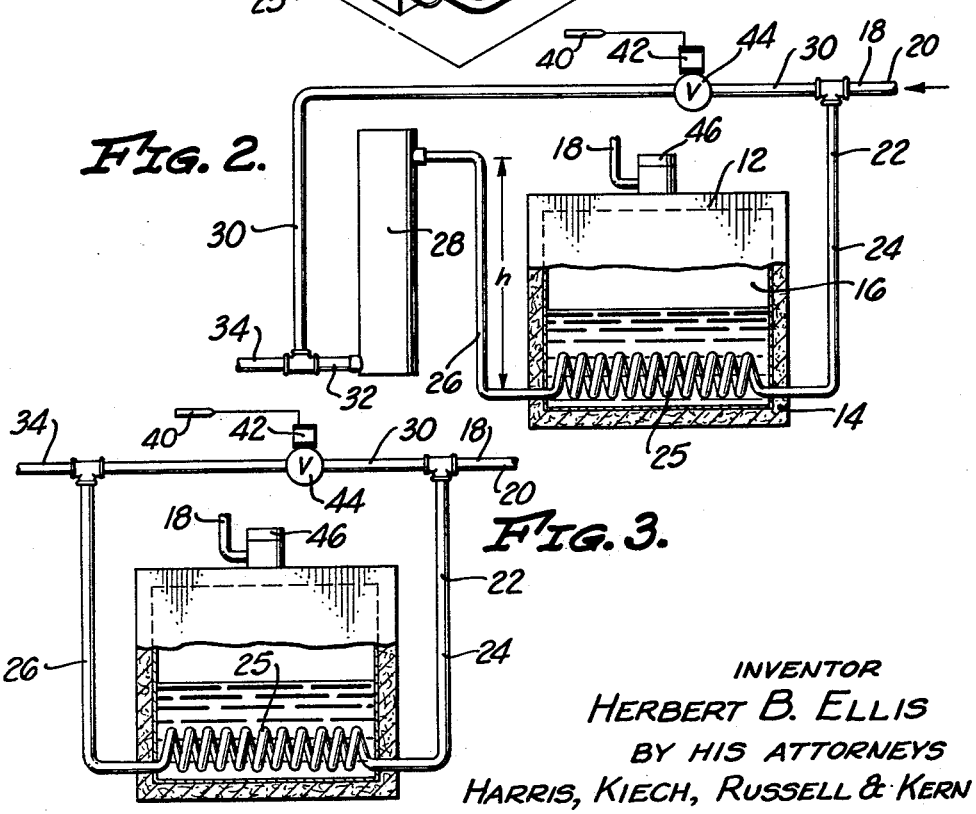
Fig. 2.
Fig. 3.
INVENTOR
HERBERT B. ELLIS
BY HIS ATTORNEYS
HARRIS, KIECH, RUSSELL & KERN March 23, 1965  H. B. ELLIS  3,174,299
REFRIGERATION SYSTEM EMPLOYING A LIQUIFIED GAS
Filed March 19, 1962  2 Sheets-Sheet 2
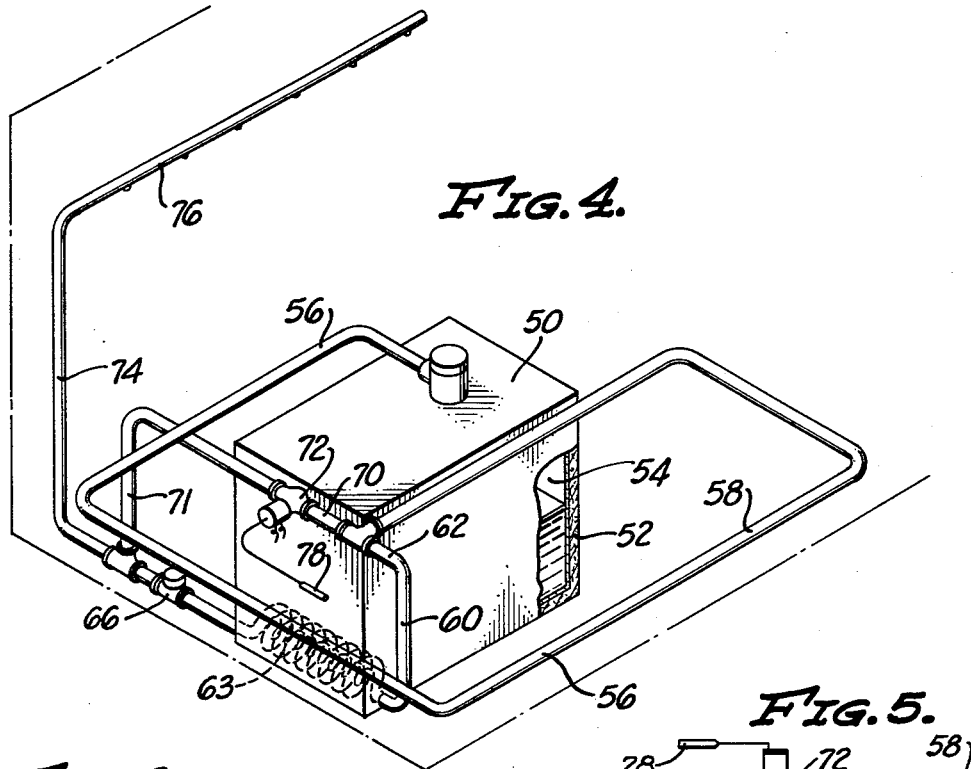
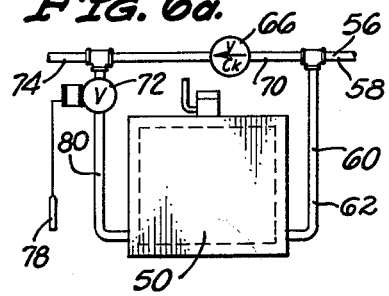
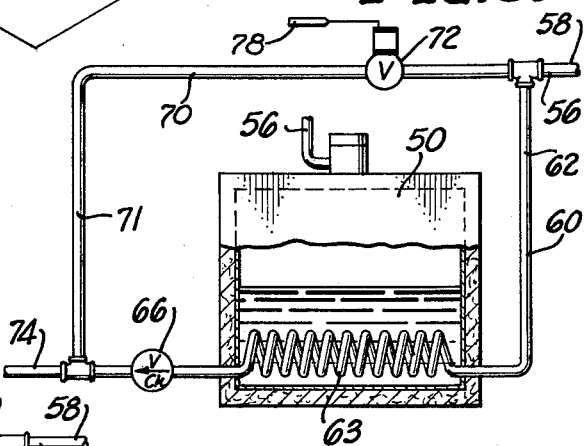
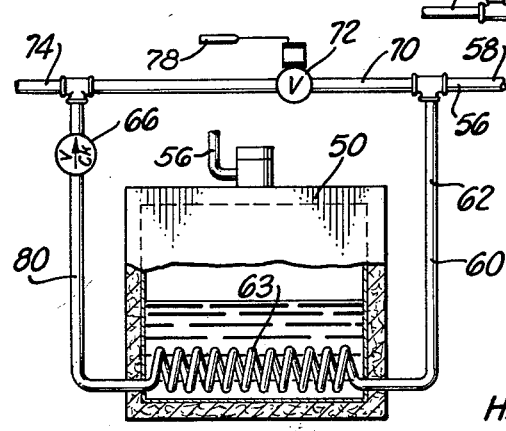
INVENTOR
HERBERT B. ELLIS
BY HIS ATTORNEYS
HARRIS, KIECH, RUSSELL & KERN United States Patent Office 3,174,299
Patented Mar. 23, 1965

3,174,299
REFRIGERATION SYSTEM EMPLOYING A LIQUIFIED GAS
Herbert B. Ellis, Pasadena, Calif., assignor to Elmwood Liquid Products, Inc., a corporation of New York
Filed Mar. 19, 1962, Ser. No. 180,588
1 Claim. (Cl. 62—216)

This invention relates to refrigeration and, more particularly, provides an improved system for regulation of gas flow in a system of the type employing liquefed gas.

In a recently developed refrigeration system of the type described in copending application Serial No. 166,215, having the same assignee as the present application and filed January 15, 1962, now abandoned, James M. Carter, an insulated vessel of liquefied gas is provided within an enclosed space or chamber being refrigerated. Heat flowing through the insulation of the vessel into the liquefied gas causes evaporation of some of the liquid. The quantity of gas so evaporated is generally inadequate to provide the needed long time refrigeration, the vessel's insulation being purposely provided in an amount so as to insure that the normal heat flow therethrough will be inadequate to maintain indefinitely the desired refrigeration temperature within the enclosed space. The evaporated gas is discharged directly, preferably into the enclosed chamber but may be used for indirect cooling and discharged exteriorly of the chamber. The gas evaporated by the inflow of heat through the wall of the insulated vessel is removed in a line having a heating segment. There occurs some indirect heating of the gas within the heating segment of the removal line by the relatively warm atmosphere of the space. With rise in temperature above a predetermined value, heated gas carried by the line is returned to the insulated vessel, where it is used to heat the liquefied gas body, thus accelerating evaporation of the liquefied gas body and providing the additional refrigeration needed to lower the temperature of the space to its desired value. When the enclosed space is at the desired tempertaure, the gas in the removal line bypasses the insulated vessel and may be discharged directly into the atmosphere of the enclosed space. Application Serial No. 166,215 is hereby incorporated by reference.

It is an object of this invention to provide an improved system for regulating the flow of gas or vapor within a refrigeration system of the type employing liquefed gases or other vaporizable refrigerants, e.g., Dry Ice (solid carbon dioxide).

A still further object of the invention is to provide an improved self-regulating system.

Another object of the invention is to provide a control system having a minimum of parts and possessing a simple design.

A still further object of the invention is to provide a control system having inexpensive and simple components.

A still further object of the invention is to provide a system for gas or vapor refrigeration of a design less likely to require any significant maintenance.

In the refrigeration system of copending application Serial No. 166,215, a three-way control valve is employed for regulaing the flow of gas through the system. In the improved system of the invention, an on-off valve of simpler design, less expense, and greater reliability is substituted for the three-way valve. The on-off valve includes an open and a closed position. In the system of the invention there is provided, as in the system disclosed in copending application Serial No. 166,215, an insulated vessel positioned within a space, which vessel is designed to hold a pool of liquefied gas. The insulation of the vessel is of a sufficient thickness to forestall inflow of heat in an amount required to evaporate the amount of gas needed for long time refrigeration of the space. A first line removes the evaporated gas from the vessel, this line being provided with a length within the enclosed space which serves as a heat exchanger or heating segment, thus permitting indirect heating of the gas therein by the atmosphere of the space.

In response to a rise in temperature in the space above a predetermined value, heated gas from this first line is returned to the vessel and utilized to accelerate the vaporization of the liquefied gas and, in this fashion, as in the system of Serial No. 166,215, provides immediate refrigeration to lower the temperature of the space to the desired value. The heated gas in the system of the invention is returned to the vessel by a second line in communication with the heating segment of the first line. The second line has a length immersed in the liquefied gas pool and extends to a point exterior of the vessel where the gas flowing therethrough is preferably discharged into the atmosphere of the enclosed space.

A third line is provided in communication with the first line, this third line bypassing the vessel and opening preferably into the atmosphere of the enclosed space. The gas of the third line may be used in a less preferred embodiment for the indirect cooling of the space and thereafter discharged exteriorly of the space.

In the system of the invention, an on-off valve having a closed and an open position, is positioned in either the second or third lines and a temperature sensing device exposed to the atmosphere of the space is provided to open and close the valve in response to changes in space temperature. A pressure sensitive means which preferably takes the form of a check valve is positioned in the other one of the second or third lines (the aforementioned on-off valve being placed in one of the two lines) to control the gas flow therethrough. The pressure sensitive means permits gas flow through the line with which it is associated when the pressure differential across the means exceeds a predetermined value.

These and other objects of the invention will become clear in light of the following specification and drawings wherein:

FIG. 1 is an isometric view of a preferred embodiment of the system of the invention;

FIG. 2 is a simplified schematic representation of a central portion of the system of FIG. 1, which portion incorporates the innovations of the system of the invention;

FIG. 3 is a simplified schematic representation of the central portion of another embodiment of the system of the invention;

FIG. 4 is an isometric view of still another form of the refrigeration system of the invention;

FIG. 5 is a simplified diagrammatic representation of the central portion of the system of FIG. 4, which more clearly illustrates the innovations of the system of the invention;

FIG. 6 is a simplified diagrammatic representation of the central portion of still another form of the refrigeration system of the invention; and FIG. 6a is a schematic representation of a modified version of the system of FIG. 6, differing in the interchange of position of an on-off valve and a check valve.

FIG. 1 shows in phantom lines heavy insulated walls 10 of a truck or trailer body or other structure. The truck or trailer body may be of conventional design and needs no modification in preparation for installation of the system of the invention. It will be appreciated that the system of the invention may be incorporated in a nonmobile refrigeration chamber and employed to the same advantages.

The refrigeration system of the invention, which is conveniently installed at the closed end of a truck body, includes a vessel or tank 12 for liquefied refrigerant gas or other vaporizable refrigerant such as solid carbon dioxide. The vessel 12 is provided with an insulation layer 14, the thickness of which provides an appreciable and approximately calculable heat leak. A method for the calculation of the thickness of the insulation is described in copending application Serial No. 166,215. The vessel is desirably formed from a suitable metal or plastic such as polyethylene which will withstand low temperatures. The normal heat inflow through the insulation 12 is inadequate to provide the gas needed to maintain the refrigerated space at its desired temperature. Gas collects in a head space 16 of the vessel 12 and is removed in a first line or conduit 18. The conduit 18 is purposely provided with a substantial length exposed to the atmosphere of the enclosed space, the purpose of the extended length of the pipe being to provide, in effect, a heat exchanger, or heating loop segment 20. The atmosphere of the enclosed space, being at a relatively warm temperature, heats the refrigerant gas within the heating loop segment 20.

The first line 18 beyond the heating loop segment 20 joins with a second line 22 which returns to the vessel 12. The second line 22 connects to the first line 18 at a level above the vessel and extends downwardly therefrom to provide a first leg 24 of a U-loop. The base of the U-loop takes the form of a coil 25 which is immersed in the liquefied gas pool of the vessel 12. An upleg 26 of the U-loop of the second line 22 extends upwardly to a level above the top of the vessel 12. The upper end of the upleg 26 opens into the upper end of a standpipe 28 which has a diameter significantly larger than the diameter of the second line 22. The standpipe 28 preferably has a diameter at least two times as large as the diameter of line 22.

A third line 30 couples to the first line 18 at the juncture of the first and second lines 18 and 22. A fourth line 32 which opens into the base of the standpipe 28 extends therefrom to a juncture with the third line 30. In the embodiment illustrated in FIGS. 1 and 2, the gas flowing through the second line 22 and the third line 30 is directed through a conduit 34 to a spray header 36 which is provided with a plurality of outlets 38.

A temperature sensing device 40 located in the enclosed space away from the spray header 36 is electrically, mechanically or pneumatically coupled to a solenoid 42 of an on-off valve 44 which is positioned in the third line 30 adjacent its juncture with the heating segment 20 of the first line 18. When the temperature of the refrigerated space rises above a predetermined value, the solenoid 42 is energized and closes the valve 44 to shut off flow of gas through the third line 30. This results in a build-up of pressure within the second line 22, resulting in flow of heated gas from the heating loop 20 to the second line 22 and through its immersed coil 25.

It will be appreciated that the flow of heated gas through the immersed coil 25 increases the vaporization of gas from the liquefied gas body contained within the vessel 12. When the temperature of the enclosed space, as detected by the temperature sensing device 40, has dropped to the desired temperature, the solenoid 42 is again energized and the valve 44 positioned to direct flow through the third line 30 stopping flow through the heating coil 25. The legs 24 and 26 of the U-loop of the second line 22 cooperate with the on-off valve 44 to regulate the flow of vapor through the system. In the improved system of the invention, the design assures that there will be no vapor flow through the immersed coil 25 when the valve 44 is open. It has proven important to the control and operation of the system that there be no or substantially no heat flow into the liquefied gas from the heating coil 25 when the on-off valve 44 is open. Even a very small flow of heated gas through the heating coil 25 is undesirable.

As illustrated in FIG. 2, the gravity legs 24 and 26 form a U-loop having a height $h$. The vapor in the upleg 26 is relatively cool, having recently passed through the heating coil 25, and the vapor in the downleg 24 of the second line is relatively warm, having come from the heating segment 20 of the first line 18. Product of the difference $(d_2-d_1)$ of the densities of the gases in the respective legs 24 and 26 and of the height $(h)$ of the U-loop gives the pressure that is present to resist flow of gas through the U-loop and the heating coil 25. The resistance of the third line 30 to gas flow with the valve 44 open is designed to be less than the U-loop pressure $(d_2-d_1)h$ and, with this arrangement, there will be no vapor flow through the immersed coil 25 and the second line 22 when the valve 44 is open.

When the conduit 34 to the spray header 36 connects with line 22 at a low elevation, as illustrated in FIGS. 1 and 2, there is an "inverted siphon" effect which must be overcome. A convenient manner of accomplishing this is to connect the top of the upleg 26 of the U-loop of the second line 22 to the upper end of the standpipe 28. The standpipe 28 has an enlarged interior wherein the major portion of the gas is relatively warm, approaching the temperature of the gas in the downleg 24. With this arrangement the inverted siphon effect is avoided and the differential pressure is available to block flow through the U-loop when the valve 44 is open.

Another arrangement to avoid the inverted siphon effect is illustrated in FIG. 3 where the same numbers are employed to identify components corresponding to those of FIGS. 1 and 2. In the system of FIG. 3 the need for the standpipe 28 is avoided by placing the juncture of the conduit 34 (to the spray header 36) with the lines 22 and 30 at a level above the vessel 12 and in line with the third line 30. The system of FIG. 3, except for the differences described, fully resembles that of FIGS. 1 and 4, having a heating loop 20, an immersed coil 25, and a valve 44. The other components of the system, being fully like that of FIGS. 1 and 2, have not been illustrated.

The temperature sensing device 40, if desired, may be designed to have two different actuating temperatures. For instance, the temperature at which the on-off valve 44 is actuated to close line 30 to gas flow, thus directing gas flow from the heating loop segment 20 into the second pipe 22 and its immersed coil 25, may be somewhat higher (say 38° F.) than the actuation temperature for setting of the valve 44 to direct flow into the third line 30, which may be, for example, at 35° F. The system of the invention may be used to refrigerate either frozen or chilled foods with the chamber being appropriately held above or below freezing.

The vessel 12 is provided with an insulated and removable closure cap 46 which threadedly engages the exterior of an upwardly extending neck of the vessel. The vessel may be filled with liquid nitrogen or other liquefied gas through the neck after removal of the closure cap 46.

The embodiments of FIGS. 4-6 each have a pressure actuated check valve which serves the purpose of the differential pressure U-loop of FIGS. 1-3 and may be substituted therefor or, as in the embodiment of FIG. 6, used in conjunction therewith.

The major components of the system of FIG. 4 generally resemble that of FIGS. 1 and 2 including a vessel 50 for liquefied refrigerant gas. The vessel is provided as before with an insulation layer 52 and is desirably made from low-temperature resistant metal or plastic. Gas collects in a head space 54 and is removed in a first line 56. The first line 56 has a heating loop 58 which joins with a downleg 60 of a second line 62. The second line 62 has a heating coil segment 63 immersed in the liquefied gas of the vessel 50. A length of the second line 62 beyond the vessel is provided with a check valve 66. The heating loop 58 of the first line 56 at its juncture with the downleg 60 of the second line 62 joins with a third line 70 which along its length is provided with an on-off valve 72. The third line 70 has a downleg 71 which joins with an extension of the second line 62 (beyond the check valve 66) to a conduit 74. The conduit 74 leads to a spray header 76 that discharges the gas directly into the atmosphere of the space.

The check valve 66 requires a relatively low pressure to open. When the on-off valve 72 of the third line 70 is open to flow of gas from the heating loop 58, the pressure within the second line 62 is insufficient to open the check valve 66. With closing of valve 72, pressure builds up in the second line 62, forcing open the check valve 66 and thus permitting gas flow through the heating coil 63 and the second line 62.

The system of FIGS. 4 and 5 has a temperature sensing device 78 which operates in the fashion described above.

The system of FIG. 6 resembles that of FIG. 4 in that a check valve 66 is employed. The same numbers are used throughout FIG. 6 as employed in FIGS. 4 and 5 to identify like components. As before, the heating loop 58 has a three-way juncture with the third line 70 and the downleg 60 of the second line 62. The third line carries an on-off valve 72. The system of FIG. 6 differs from that of FIGS. 4 and 5 in that the second line 60 has an upleg 80 whose upper end joins with the third line 70 at a level above the vessel 50. The check valve 66 is placed in the upleg 80, preferably at a height above the vessel and adjacent to the juncture with the third line 70. In the embodiment of FIG. 6, the differential pressure deriving from the U-loop construction and the check valve 66 work together to forestall the gas flow through the second line 62 and its immersed heating coil 63 when valve 72 of the third line is open.

The system of FIG. 6a is like that of FIG. 6 differing only in the interchange of position of the on and off valve 72 and the check valve 66. The temperature sensing device 78 is connected to the on-off valve 72 which in this embodiment is in the second line 62. When the temperature of the space rises above a desired value, the temperature sensing device 78 signals the on-off valve 72, opening line 62 to gas flow. When the on-off valve 72 of the second line 62 is in its open position permitting the flow of gas through the immersed heating loop, the pressure within the third line 70 is inadequate to open the check valve 66 placed therein. With closing of valve 72, pressure builds up in the third line 70, forcing open the check valve 66 and permitting gas flow through the third line, thereby effectively bypassing the immersed heating coil.

The method for calculating a suitable thickness of insulation to be used on the liquefied gas containing vessel has been described in detail in the copending application Serial No. 166,215, and need not be repeated here. An appreciable fraction of the required refrigerant gas (but less than the total amount needed) is produced by heat leak through the insulation into the container; that is to say, the gas evaporated from the liquefied gas pool within the container due to heat leak through the insulation is generally insufficient to provide the needed refrigeration. The additional refrigeration is generated through return of the heated gas from the heating loop to the heating coil immersed in the liquefied gas body.

Although exemplary embodiments of the invention have been disclosed herein for purposes of illustration, it will be understood that various changes, modifications, and substitutions may be incorporated in such embodiments without departing from the spirit of the invention as defined by the claim which follows.

What is claimed is:

A system for refrigerating an enclosed space utilizing vaporizable refrigerant, said system comprising:
 means forming an enclosed space;
 an insulated vessel positioned within said space designed to hold a body of vaporizable refrigerant;
 a first line for removing vapors from the vessel, said line having a length within the enclosed space permitting indirect heating of the vapor therein by the atmosphere of said space;
 a second line in communication with the heating length of the first line and leading to the vessel, said second line joining to the first line at a level above the vessel and extending downwardly therefrom to provide a first leg of a U-loop with the base of the U-loop being within the vessel and with the upleg of the U-loop extending upwardly to a level above said vessel;
 a standpipe with its upper end above said vessel and connecting with the upper end of the upleg of the U-loop of the second line;
 a third line coupled to the first line;
 a fourth line opening into the base of the standpipe and extending therefrom to a juncture with said third line;
 a valve within the third line; and
 a temperature sensing device exposed to the atmosphere of the space, said sensing device opening and closing the valve of the third line in response to changes in temperature of the enclosed space.

References Cited by the Examiner

UNITED STATES PATENTS

| | | | |
|---|---|---|---|
| 1,942,944 | 1/34 | Smith | 62—51 |
| 2,363,200 | 11/44 | Pew | 62—51 |
| 2,842,942 | 7/58 | Johnston | 62—50 |

ROBERT A. O'LEARY, *Primary Examiner.*

MEYER PERLIN, *Examiner.*